United States Patent [19]

Russak

[11] 4,436,558
[45] Mar. 13, 1984

[54] ELECTROCHEMICAL PHOTOVOLTAIC CELL HAVING TERNARY ALLOY FILM

[75] Inventor: Michael A. Russak, Farmingdale, N.Y.

[73] Assignee: The United States of America as represented by the United States Department of Energy, Washington, D.C.

[21] Appl. No.: 351,376

[22] Filed: Feb. 23, 1982

Related U.S. Application Data

[62] Division of Ser. No. 216,706, Dec. 15, 1980, abandoned.

[51] Int. Cl.³ ............................................... H01L 21/00
[52] U.S. Cl. ..................................... 148/1.5; 148/175; 429/111
[58] Field of Search ............... 148/175, 1.5; 427/87, 427/86, 82; 429/111; 420/903

[56] References Cited

U.S. PATENT DOCUMENTS

| | | | |
|---|---|---|---|
| 2,938,816 | 5/1960 | Günter | 427/87 |
| 3,218,203 | 11/1965 | Ruehrwein | 148/175 |
| 3,920,860 | 11/1975 | Freller et al. | 427/87 |
| 4,296,188 | 10/1981 | Hodes et al. | 429/111 |

OTHER PUBLICATIONS

"Evaporation Source for the Co-Deposition of Materials with Different Vapor Pressures", R. J. Gambino, IBM Technical Disclosure Bulletin, vol. 14, No. 1, Jun. 1971, pp. 133-135.
"Alloy Films of $PbTe_xSe_{1-x}$", R. F. Bis, et al., Journal App. Physics, vol. 37, No. 1, Jan. 1966, pp. 228-230.

Primary Examiner—L. Dewayne Rutledge
Assistant Examiner—S. Kastler
Attorney, Agent, or Firm—Walter L. Rees; Jeannette M. Walder; Michael F. Esposito

[57] ABSTRACT

A thin film compound semiconductor electrode comprising $$CdSe_{1-x}Te_x (0 \leq x \leq 1)$$

is deposited on a transparent conductive substrate. An electrolyte contacts the film to form a photoactive site. The semiconductor material has a narrow energy bandgap permitting high efficiency for light conversion. The film may be fabricated by: (1) co-evaporation of two II-VI group compounds with a common cation, or (2) evaporation of three elements, concurrently.

2 Claims, 5 Drawing Figures

ELECTROCHEMICAL PHOTOVOLTAIC CELL HAVING TERNARY ALLOY FILM

The United States Government has rights in this invention pursuant to Subcontract No. XP-9-8002-8 between Midwest Research Institute, Solar Energy Research Institute Division and Grumman Aerospace Corporation issued pursuant to Contract No. EG-77-C-01-4042 between Midwest Research Institute and the U.S. Department of Energy.

This is a division of application Ser. No. 216,706, filed Dec. 15, 1980, abandoned.

FIELD OF THE INVENTION

The present invention relates to electrochemical photovoltaic cells and method for the fabrication thereof, and more particularly to such a cell including a semiconductor electrode characterized as a ternary alloy film having an optimum spectral absorption characteristic, relative to the solar spectrum.

BACKGROUND OF THE INVENTION

Great effort has been expended to provide alternatives of the finite sources of energy currently available. One alternative contemplated is the generation of electrical energy by conversion of solar radiation. The scientific literature has provided several examples of photoelectrochemical systems useful for the photoelectrolysis of water or the photo-oxidation of some suitable redox species. The theory underlying these systems and phenomena is reasonably well understood and is outlined, for example, in the following publications:

Gerischer, "Electrochemical Photo and Solar Cells Principles and Some Experiments", *Electroanalytical Chemistry and Interfacial Electrochemistry*, Vol. 58, pp. 263–274 (1975); Manassen et al, "Electrochemical, Solid State, Photochemical and Technological Aspects of Photoelectrochemical Energy Converters", *Nature*, Vol. 263, pp. 97–100 (1976); Ellis et al., "Study of N-Type Semiconducting Cadmium Chalcogenide-Based Photoelectrochemical Cells Employing Polychalcogenide Electrolytes", *J. American Chemical Society*, Vol. 99, pp. 2839–48 (1977); Wrighton et al., "Photo-Assisted Electrolysis of Water by Irradiation of a Titanium Dioxide Electrode", *Proc. Nat. Acad. Sci., U.S.A.*, Vol. 72, No. 4, pp. 1518–1522 (1975); and Manassen et al U.S. Pat. No. 4,064,326.

The photoelectrodes as generally described are semiconductors, n-type semiconductors being photo-anodes and p-type semiconductors being photo-cathodes. The semiconductors may be large bandgap materials, for example, n-TiO$_2$ or small bandgap materials, for example n-GaAs. However, the application of photoelectrochemical semiconductor-electrolyte systems to the conversion of solar radiation to electrical energy suggests that semiconductors with bandgaps near 1.4 eV will be the most efficient with respect to the amount of solar radiation that can be usefully absorbed and converted to electrical energy. This consideration is well known from the established theory of solid state photovoltaic devices. Until recently, however, small bandgap materials could not be employed as photo-anodes for example, since irradiation in the presence of an electrolyte usually resulted in the photodissolution of the semiconductors. Several examples of redox couples are now known that will essentially eliminate the photo-dissolution of small bandgap semiconductors, such as disclosed in U.S. Pat. No. 4,172,925.

The usefulness for utilizing a ternary thin film compound semiconductor electrode layer in a solar radiation conversion device has also been recognized in the prior art. U.S. Pat. No. 3,218,203 discloses the structure and method for the production of epitaxial films of II-VI compounds by the reaction in the vapor phase of a group II component and a volatile group VI component in the presence of hydrogen, resulting in a solid state configuration. In this patent the ternary alloy disclosed is the same material as disclosed herein, namely an alloy including Cd, Se, and Te. In accordance with this prior patent, the alloy is formed by epitaxially depositing CdTe onto a CdTe crystal substrate and after some time the rate of depositing the CdTe is slowly reduced while at the same time CdSe is evaporated and deposited onto the substrate in a gradually increasing fashion. However, this method for forming the alloy is both time consuming and costly.

BRIEF DESCRIPTION OF THE PRESENT INVENTION

The present invention is directed to the use of ternary thin film compound semiconductor electrode layers fabricated by either (1) vacuum co-evaporation of two compounds with a common cation, such as CdSe and CdTe, or by (2) the vacuum evaporation of three elements concurrently to produce the alloy

$$CdSe_{1-x}Te_x (0 \leq x \leq 1)$$

whereas CdSe has been used in the prior art directed to wider bandgap materials (1.7 eV), the addition of the second material, CdTe or Te in the present invention, reduces the bandgap of the composite material toward that of CdTe alone (approximately 1.4 eV) which has an optimum spectral absorption characteristic relative to the solar spectrum. Yet, the chemical stability of CdSe in aqueous sulfide/polysulfide electrolyte, is maintained. This approach is particularly appropriate to the II-VI class of compounds, of which the CdX series is a prime example, where X is O, S, Se or Te.

The above-mentioned objects and advantages of the present invention will be more clearly understood when considered in conjunction with the accompanying drawings, in which:

DETAILED DESCRIPTION OF THE INVENTION

Figure 1:
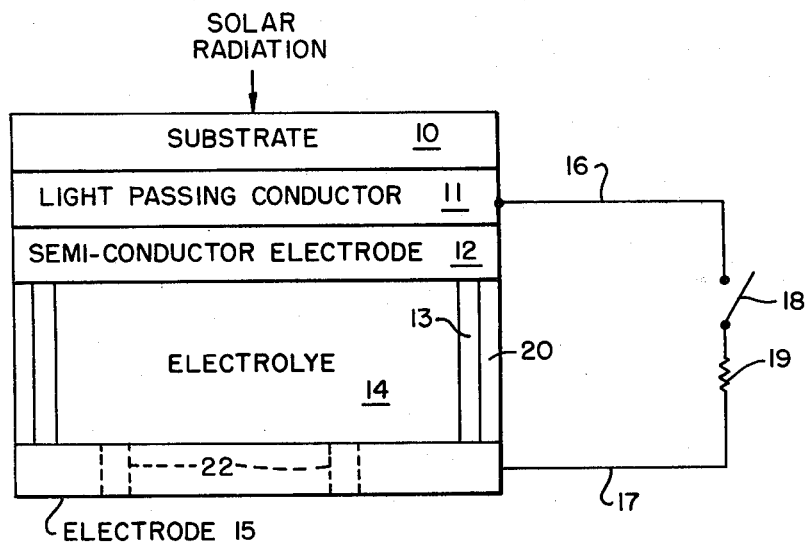
FIG. 1 is a diagrammatic view of a photoelectrochemical cell including a semiconductor electrode fabricated in accordance with the present invention.

A typical cell structure utilizing the ternary alloy is illustrated in FIG. 1. A transparent substrate 10 is covered with a light passing (transparent or opaque) conductor 11. Such a combination is commercially available as NESA glass. Other types of commercially available substrate-conductor combinations are available. These include $In_2O_3$ and $SnO_2$ (or doped $SnO_2$) coated glass and titanium coated glass. Other coatings include Pt and Mo. A semiconductor electrode 12 is deposited on the light passing conductor 11 as may be accomplished in accordance with the process to be discussed hereinafter. It is the material of the semiconductor electrode 12 which differentiates the structure of FIG. 1 from a comparable structure in previously mentioned U.S. Pat. No. 4,172,925.

An electrolyte 14 is surrounded by walls formed by an annular spacer 13 and an epoxy structure 20. A second electrode 15 forms the lower boundary of the cell. Fill holes 22 are located in electrode 15 to permit the injection of electrolyte material into the volume provided internally of the cell. Thereafter, the holes may be sealed. The seals may be permanently or replaceably installed in holes 22. It should be noted that the fill holes may be located in other components of the structure. For example, they may be placed in the spacer 13 or through the components 10, 11 or 12. Electrical leads 16 and 17 are respectively connected to light passing conductor 11 and electrode 15 and will typically be connected to a load illustrated by resistor 19. A switch 18 is placed in the circuit. The direction of solar radiation is indicated in FIG. 1. With switch 18 closed, and in the presence of solar radiation, the cell illustrated in FIG. 1 will generate a voltage across resistor 19.

Figure 2:
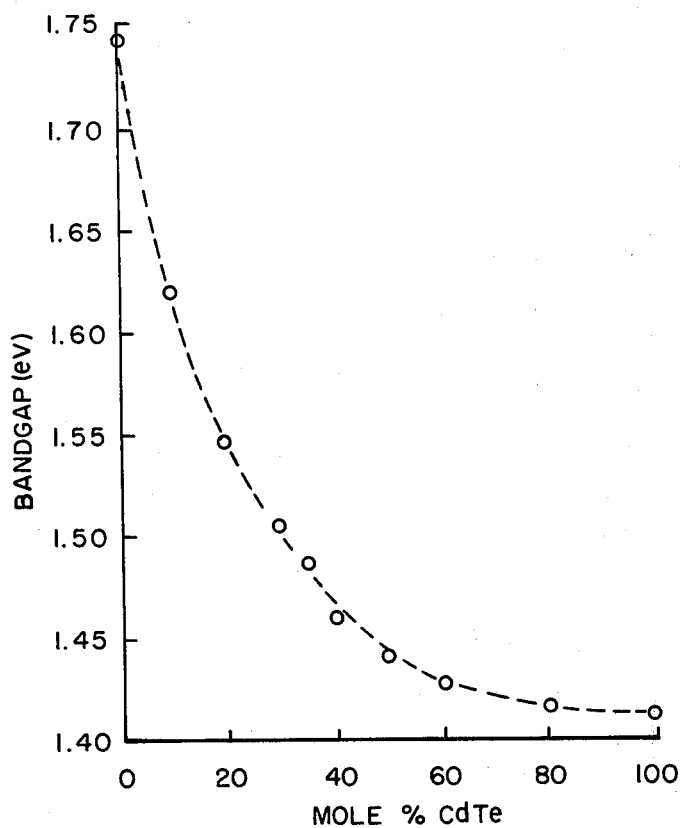
FIG. 2 is a plot of the variation of bandgap with CdTe content for co-evaporated CdSe-CdTe films.
Figure 3:
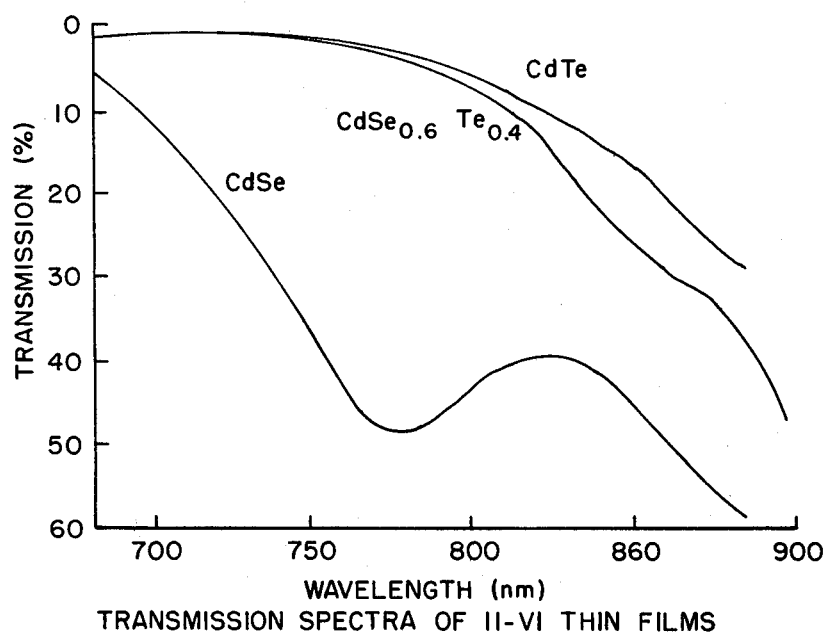
FIG. 3 is a composite plot of the transmission spectra of indicated II-VI thin films.
Figure 4:
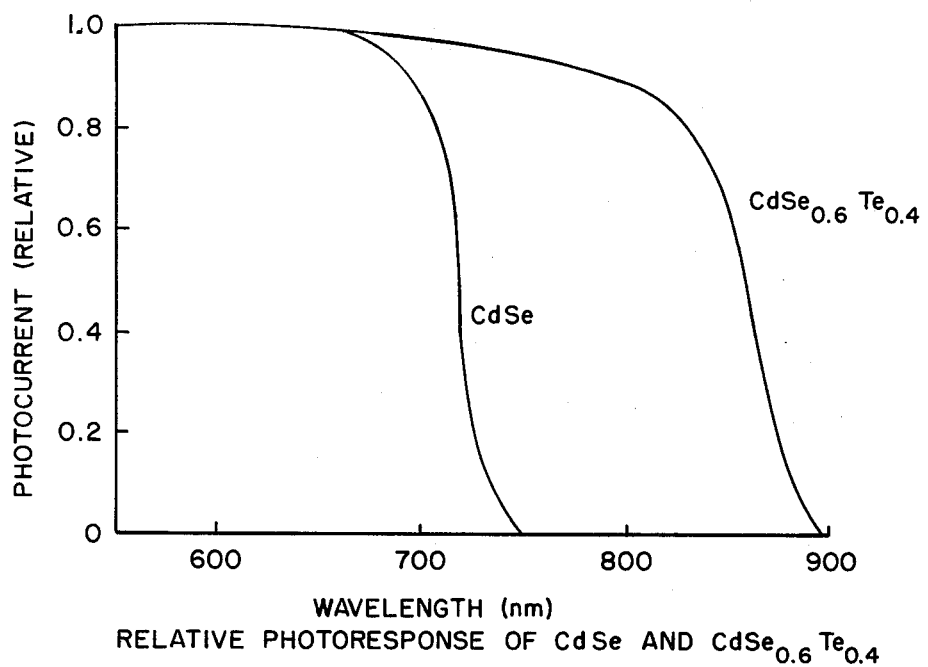
FIG. 4 is a composite plot of the relative response of CdSe and CdSe$_{0.6}$Te$_{0.4}$ thin film electrodes.

The effect of mixing CdTe and CdSe in various proportions on the bandgap of the semiconductor electrode 12 is illustrated in FIG. 2. The semiconductor electrode 12, used for procuring the test results shown in FIG. 2 was produced by co-evaporation of CdSe and CdTe at predetermined rates to achieve each specific composition. The key consideration is the addition of approximately 30 percent CdTe and CdSe, the bandgap of the alloy film being reduced as a result thereof, to approximately that of CdTe alone. The advantage of this in terms of photocurrent output of a photoelectrochemical cell electrode is shown in FIGS. 3 and 4 which are, respectively, the transmission curves for a selected alloy film compared to CdSe and CdTe alone, and the spectral photoresponse of the same alloy film electrode relative to a CdSe electrode.

Thus far in the discussion, the structure has been discussed with emphasis upon the ternary alloy film. Specifically, one aspect of the present invention is the utilization of such a film in contact with an appropriate electrolyte to form a photoactive site. The alloy film can be made by mixtures of any two II-VI compounds with a common cation although the resultant film material

$CdSe_{1-x}Te_x (0 \leq x \leq 1)$ is a preferred embodiment.

A second aspect of the present invention is directed toward the process for fabricating the semiconductor electrode 12 comprising the alloy film.

EXAMPLE I

Figure 5:
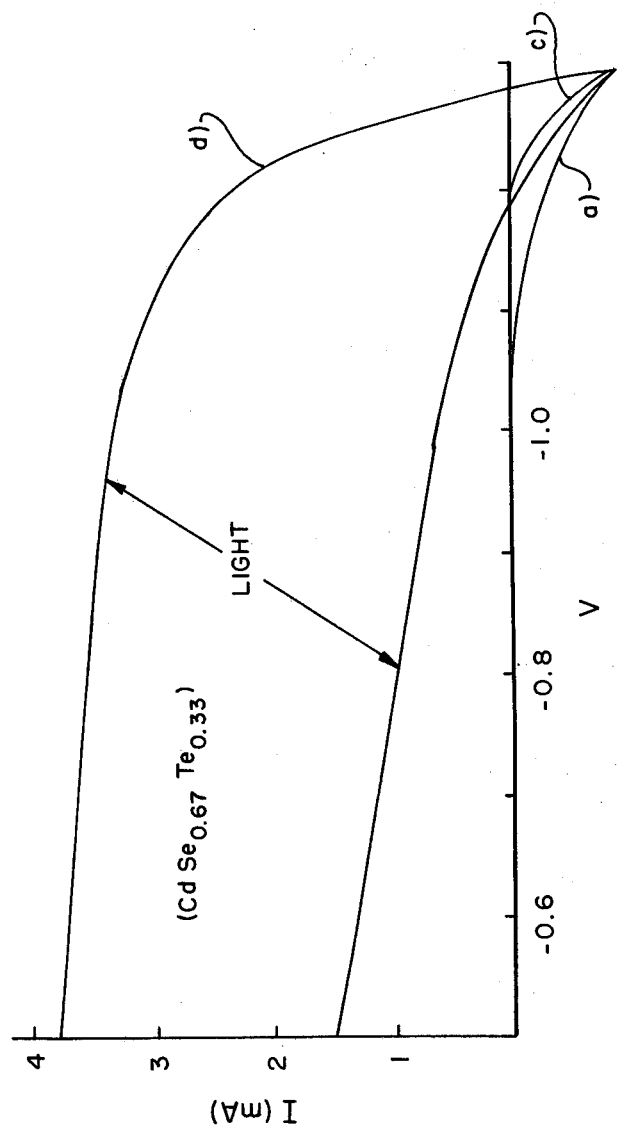
FIG. 5 is a composite plot of the current-voltage performances of CdSe$_{0.67}$Te$_{0.33}$ thin film electrode.

Suitably cleaned pieces of $In_2O_3$-$SnO_2$ (or doped $SnO_2$) coated glass or equivalently titanium sheet material (approximately 0.01 inch thick), or coatings including Pt or Mo are clamped to a substrate holder which is retained in a vacuum chamber in such a way that the cleaned substrates are exposed to two resistive heated sources, one of which contains CdSe and the other CdTe. The vacuum system is sealed and pumped to less than $10^{-5}$ Torr. The deposition rate of such compound is then controlled at a predetermined rate, depending on the specific alloy film composition required by a digital feedback controller. A suitable controller is manufactured by Sloan Technology Corp. (MDC 9000). The CdSe rate is 10 Å/s and the CdTe rate is 6.5 Å/s. The resultant alloy film composition will be $CdSe_{0.67}Te_{0.33}$ and film thickness is measured to be 2 microns thick. The composite electrodes are removed from the vacuum deposition chamber and heat treated in air or argon at approximately 450 degrees Centigrade for 15 minutes. Then, an electrical lead such as 16 is attached. Typical results of the electrode on a Ti substrate are shown in FIG. 5. Curves (a) and (b) are the dark and light current-voltage tracers, respectively, of the electrodes after heat treatment. Curves (c) and (d) are the dark and light tracers after a 1 second etch in a 50:1 volume ratio of HCL and HNO.

Although the curves shown in FIG. 5 were obtained utilizing a Ti substrate, utilization of a $SnO_2$-$In_2O_3$ coated glass substrate would behave similarly.

EXAMPLE II

The alloy film can be made by a three source evaporation of the constituent elements, for example, Cd, Se and Te.

Suitably cleaned conducting substrates as described in Example I are clamped to a substrate holder, equipped with means of heating, which is retained in a vacuum chamber in such a manner that the substrates are exposed to three resistive heated evaporation sources containing Cd, Se and Te, respectively. The vacuum system is sealed and pumped to less than $10^{-5}$ Torr. The deposition rate of each element is then controlled at a predetermined rate, depending on the specific alloy composition, required by a feedback controller, such as disclosed above. The Cd rate was 10 Å/S, Se rate 8.2 Å/S, the Te rate 5.5 Å/S and the substrate temperature was 90 degrees Centigrade. The resultant alloy composition was $CdSe_{0.60}Te_{0.31}$. With a post deposition heat treatment of 350 degrees Centigrade for 15 minutes in air and a brief chemical etch, photovoltaic behavior similar to that shown in FIG. 5(d) was observed.

EXAMPLE III

In this Example, the equipment and approach were basically the same but the Cd rate was 5 Å/S, the Te rate 3 Å/S, the Se rate was 4.5 Å/S and the substrate temperature 450 degrees Centigrade. The resultant alloy composition was $CdSe_{0.67}Te_{0.33}$. With heat treatment and etching, photovoltaic behavior similar to that shown in FIG. 5(d) was obtained.

It should be kept in mind that other heat treatment schedules may be employed and that other etching and chemical dipping procedures can also be used to enhance the current-voltage performance. Further, the disclosed electrodes may be employed in cells having different configurations from that shown in FIG. 1.

It should be understood that the invention is not limited to the exact details of construction shown and described herein for obvious modifications will occur to persons skilled in the art.

I claim:

1. A method for fabricating a thin film compound semiconductor electrode of $CdSe_{1-x}Te_x$, where $0 \leq x \leq 1$, for an electrochemical photovoltaic cell comprising the steps:
- evacuating a chamber;
- exposing a light passing conducting substrate to three heated sources respectively including the elements Cd, Se, and Te; wherein the substrate is maintained at a temperature of about 90° C.;
- simultaneously depositing the elements on the substrate at predetermined rates; and
- heat treating the electrode.

2. A method for fabricating a thin film compound semiconductor electrode of $CdSe_{1-x}Te_x$, where $0 \leq x \leq 1$, for an electrochemical photovoltaic cell comprising the steps of:
- evacuating a chamber;
- exposing a light passing conducting substrate to three heated sources respectively including the elements Cd, Se, and Te; wherein the substrate is maintained at a temperature of about 90° C.;
- simultaneously depositing the elements on the substrate at predetermined rates; and
- heat treating the electrode in air or argon at about 350° C.

* * * * *